April 8, 1952  E. FRANKLAND  2,592,409
PILOT GAUGE
Filed May 15, 1945
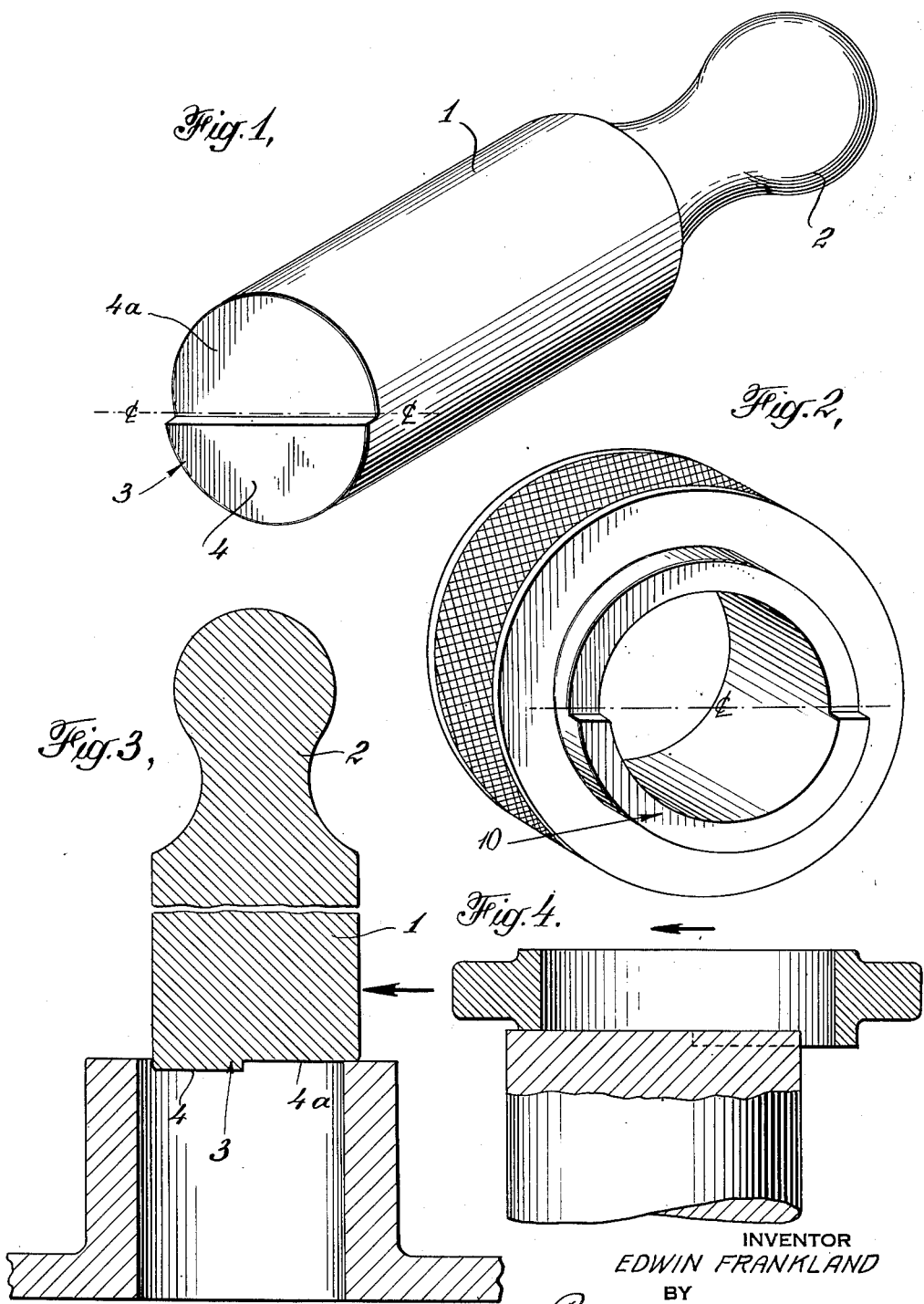
INVENTOR
EDWIN FRANKLAND
BY
Pennie, Davis, Marvin & Edmonds
ATTORNEYS Patented Apr. 8, 1952

2,592,409

UNITED STATES PATENT OFFICE 2,592,409

PILOT GAUGE

Edwin Frankland, Detroit, Mich., assignor to Vinco Corporation, Detroit, Mich., a corporation of Michigan Application May 15, 1945, Serial No. 593,955

5 Claims. (Cl. 33—178)

This invention relates to plug gauges and to ring gauges such as commonly used to gauge the accuracy of cylindrical bores and of shafts, rods and pins, respectively.

Where permissable tolerances are very small, considerable difficulty is encountered in inserting the plug gauge in the bore to be checked, and also in placing the ring gauge over the rod or shaft even though the parts being gauged have been accurately finished to the exact dimensions required. In order to facilitate the use of such gauges it has been proposed to from the end of the plug gauge with some form of "pilot" of reduced diameter which permits the gauge to be inserted in the opening to be gauged, even though the gauge and the part are not in exact alignment to thereby aid the operator in bringing the parts into alignment and guiding the measuring portion of the gauge into proper position for determining whether or not the part is of proper dimensions. Such pilot gauges are shown, for example, in the patent to Martell, No. 1,393,233 and the patent to Lee, No. 2,199,052. Ring gauges have also been formed with tapered "pilot" surfaces surrounding the gauge opening, and such gauges can be used with greater speed than the ordinary plug gauges and ring gauges without the pilot feature.

One trouble, however, with such gauges, is that although the pilot serves to guide the gauge into the opening or over the part being measured, it is still necessary for the operator to bring the parts into alignment before the measuring portion of the gauge can be brought into proper position. The pilot serves to bring the parts into approximate alignment, but the final alignment must be accomplished by manipulating the gauge, and it frequently happens that even with pilot gauges of the character disclosed in the above patents, the gauge and the part being measured are pushed together when slightly out of alignment and have to be repeatedly pulled apart and reassembled before the measuring portion of the gauge has sufficiently traversed the length of the part being measured to determine its accuracy.

According to my invention, this difficulty is removed and with gauges constructed according to the present invention the pilot not only facilitates the bringing together of the gauge and the part to be measured, but also brings the parts into exact alignment one with the other so that if the part has been finished to the proper dimensions and configuration to receive the gauge the matching of the gauge and the part will be immediately apparent, as will also any departure from the proper dimensions in excess of the permissible tolerance.

In the accompanying drawings:

Fig. 1 shows in perspective a plug gauge embodying my invention;

Fig. 2 is a similar view of a ring gauge;

Fig. 3 shows in vertical section the plug-gauge of Fig. 1 as it is manipulated in operation; and Fig. 4 is a similar view of the ring gauge.

Referring to the drawings, 1 indicates the body or gauging portion of the plug gauge. This body portion consists of a solid cylindrical part accurately finished throughout its length to the exact diameter, in the case of a "Go" gauge, of the bore to be measured less the permissible tolerance. For example, the plug may be one inch in diameter less two ten thousandths of an inch. The portion of the gauge above the body 1 is reduced in diameter to form a handle 2, and at its opposite end is formed with a pilot 3. According to my invention the pilot 3 is of segmental shape, its peripheral portion conforming exactly with the surface of the body portion. This segment is slightly less than a full semicircle, and the end face 4 of the segment and the end face 4a of the body portion are both accurately finished to planes which are exactly normal with the axis of the body portion. The edge of the pilot section between its outer face and the cylindrical surface, and also the corresponding edge of the body portion, are preferably rounded or beveled, as shown, to avoid sharp edges.

In using my improved plug gauge, the pilot portion is inserted in the bore to be measured, which is easily accomplished for the maximum dimension of the pilot portion, that is, the chord of the segment, is slightly less than the diameter of the bore to be measured. This initial insertion is readily accomplished by moving the plug across the bore in a direction corresponding to the radius of the segment, as indicated by the arrow in Fig. 3. In this movement the contacting faces of the end of the pilot and the face of the metal surrounding the bore to be measured serve to maintain the axial lines of the gauge and the bore in substantial parallelism. As the movement in this direction proceeds, the chord of the segment-shaped pilot reaches a position approximately corresponding with the diameter of the bore to be measured, and in this position the pilot will readily drop into the bore, allowing the under surface of the body of the gauge to contact with the surface of the metal surrounding the bore, thereby maintaining the substantial parallelism of the axial lines of the gauge and the bore to be checked.

To bring the measuring portion of the gauge into the bore, transverse movement of the gauge is continued, the operator preserving a sliding contact between the under surface of the body of the gauge and the surface of the metal surrounding the bore until the side wall of the pilot portion of the gauge contacts the surface of the bore. These surfaces are complementary convex and concave surfaces and tend upon movement of one toward the other to effect of themselves such adjustments as necessary for the two surfaces to contact throughout the entire area. When the curved surface of the pilot portion does come into full contact with the contiguous surface of the bore, the gauge will be centered with the bore and in exact parallelism so that if the bore is of the proper shape and dimensions the gauge will readily drop into the bore even though the tolerances be very close.

Bores which must be finished to an accuracy of .0001 of an inch on all diameters can be rapidly checked with a "Go" gauge constructed in accordance with the foregoing description. Likewise a "No Go" gauge finished to the dimensions of .0001 greater than the exact diameter of the bore can be used rapidly to determine bores which are more than .0001 greater than the exact calculated diameter. In the use of such gauges at the present time, even with pilots such as described in the above mentioned patents, the operator has to handle the gauge very carefully in order to know that its failure to enter the bore is not due to his failure to exactly align the gauge and bore.

With a gauge of the construction above described the gauge enters the bore with such facility that if the bore is large enough for the "No Go" gauge to enter it at all, it will do so readily and consequently a failure of the "No Go" gauge to enter the bore can be taken immediately as an indication that the bore is not oversize.

The ring gauge illustrated in Fig. 2 embodies the same principle as the plug gauge, but of course in reverse. In the ring gauge the pilot 10 consists of a projection on a portion of the ring slightly less than 180° in extent. The end faces of the pilot and the cutaway portion of the ring are both finished to surfaces accurately at right angles to the axis of the ring. In using the ring gauge the end face of the pilot 10 is pressed against the end face of the rod or shaft to be checked and the gauge is shifted laterally in a direction as shown by the arrow in Fig. 4 to bring the center of the gauge into alignment with the center of the shaft or rod. Before the centers come into alignment in this movement the pilot will clear the end of the rod or shaft and the end of the rod or shaft will then contact the finished surface of the cutaway portion of the ring. Continued movement of the ring gauge in the same direction will bring the inner concave surface of the pilot into contact with the convex surface of the rod adjacent the end, and the gauge will automatically center itself on the rod so as to be readily slipped over the rod if the dimensions of the rod are within the tolerances permitted.

When the "No Go" ring gauge is used in the same manner its failure to slip over the end of the rod or shaft will indicate with certainty that the dimensions of the shaft or rod are not below the permitted tolerance.

In the foregoing specification and accompanying drawings I have illustrated a preferred form of my invention as applied to plug and ring gauges. It is to be understood, however, that my invention is not limited to the specific structures herein disclosed, but cover all such modifications thereof as fall within the scope of the appended claims.

In the appended claims I have used the word "substantial" in defining the portion of the pilot extension whose area is contiguous with the gauging surface to mean a sufficient area of surface to facilitate centering the gauge with the bore or shaft to be measured.

I claim:

1. A gauge having a continuous cylindrical gauging surface of more than 180 degrees extent including a body portion bounded by said surface having a plane end face normal to said surface and a pilot extension of said body portion bounded for a substantial portion of its wall area by said surface, said extension covering a minor portion of the said end face of said body portion.

2. A gauge having a continuous cylindrical gauging surface of more than 180 degrees extent including a body portion bounded by said surface having a plane end face normal to said surface and a pilot extension of said body portion bounded for a substantial portion of its wall area by said surface and having its end face a plane normal to said surface, said extension covering a minor portion of the said end face of said body portion.

3. A plug gauge having an external continuous cylindrical gauging surface of more than 180 degrees extent including a body portion bounded by said surface having a plane end face normal to said surface and a segment shaped pilot extension of said body portion bounded for a substantial portion of its wall area by said surface, said extension covering a minor portion of the said end face of said body portion.

4. A plug gauge having an external continuous cylindrical gauging surface of more than 180 degrees extent including a body portion bounded by said surface having a plane end face normal to said surface and a segment shaped pilot extension of said body portion bounded for a substantial portion of its wall area by said surface and having its end face a plane normal to said surface, said extension covering a minor portion of the said end face of said body portion.

5. A ring gauge having an internal cylindrical gauging surface including an annular body portion internally bounded by said surface and having a plane end face normal to said surface and a pilot extension of said body portion having a plane end face normal to said surface bounded for a portion of its wall area by said surface, said portion of said extension boundary surface extending for less than 180° of arc and said extension covering a minor portion of the end face of said body portion.

EDWIN FRANKLAND.

REFERENCES CITED

The following references are of record in the file of this patent:

UNITED STATES PATENTS

| Number | Name | Date |
| --- | --- | --- |
| 1,152,792 | Corey | Sept. 7, 1915 |
| 1,450,185 | Meyers | Apr. 3, 1923 |
| 2,298,898 | Oswin | Oct. 13, 1942 |

FOREIGN PATENTS

| Number | Country | Date |
| --- | --- | --- |
| 35,122 | Sweden | July 9, 1913 |
| 136,689 | Great Britain | Dec. 24, 1919 |
| 291,286 | Great Britain | May 31, 1928 |
| 520,065 | Great Britain | Apr. 12, 1940 |